(12) United States Patent
Mukkavilli

(10) Patent No.: US 8,707,266 B2
(45) Date of Patent: Apr. 22, 2014

(54) COMMAND LINE INTERFACE ROBUSTNESS TESTING

(75) Inventor: Lakshmankumar Mukkavilli, Sunnyvale, CA (US)

(73) Assignee: CISCO Technology, Inc., San Jose, CA (US)

( * ) Notice: Subject to any disclaimer, the term of this patent is extended or adjusted under 35 U.S.C. 154(b) by 245 days.

(21) Appl. No.: 13/053,065

(22) Filed: Mar. 21, 2011

(65) Prior Publication Data

US 2012/0246621 A1 Sep. 27, 2012

(51) Int. Cl.
*G06F 9/44* (2006.01)
*G06F 15/173* (2006.01)
*G06F 17/00* (2006.01)

(52) U.S. Cl.
USPC ........... 717/124; 717/126; 709/223; 707/690; 707/696

(58) Field of Classification Search
None
See application file for complete search history.

(56) References Cited

U.S. PATENT DOCUMENTS

| | | | | |
|---|---|---|---|---|
| 6,081,804 | A * | 6/2000 | Smith | 707/696 |
| 2003/0188299 | A1* | 10/2003 | Broughton et al. | 717/141 |
| 2007/0174713 | A1* | 7/2007 | Rossi et al. | 714/38 |
| 2007/0195801 | A1* | 8/2007 | Hellgren et al. | 370/401 |
| 2007/0208693 | A1* | 9/2007 | Chang et al. | 707/2 |
| 2007/0266137 | A1* | 11/2007 | Malik | 709/223 |
| 2009/0177876 | A1* | 7/2009 | Wang et al. | 713/1 |
| 2009/0204591 | A1* | 8/2009 | Kaksonen | 707/3 |
| 2010/0094770 | A1* | 4/2010 | Sachedina | 705/348 |
| 2011/0161272 | A1* | 6/2011 | Love et al. | 706/47 |

\* cited by examiner

*Primary Examiner* — Don Wong
*Assistant Examiner* — Mohammad Kabir
(74) *Attorney, Agent, or Firm* — Patterson & Sheridan LLP

(57) ABSTRACT

One embodiment of the present invention sets forth a method for generating one or more tests for testing a command provided by a command line interface. The command is specified in a pre-determined meta-language. The meta-language is then converted in the tokenized post-fix notation, which is processed to generate a direct acyclic graph (DAG) that represents the different permutations of the command. By traversing the DAG from a root node to a leaf node, a test can be generated. The test is then executed within the command line interface, and the result analyzed to determine whether the command line interface is operating correctly.

17 Claims, 6 Drawing Sheets

COMMAND LINE INTERFACE ROBUSTNESS TESTING

BACKGROUND OF THE INVENTION

1. Field of the Invention

Embodiments of the present invention relate generally to testing platforms and, more specifically, to command line interface robustness testing.

2. Description of the Related Art

To configure and manage a hardware/software product, the vendor typically provides a command-line interface (CLI) tool. The CLI includes a wide range of commands that can be executed by a user to perform various tasks on the product, such as network configuration, log analysis, etc. As the functionality provided by a product grows, the number and the complexity of the commands included in the CLI grow exponentially.

When developing such a CLI, testing the multitude of permutations of the commands included in the tool is extremely challenging. For example, if a command has five options, and each option can have three possible values, 3^5 tests would need to be generated and executed on the CLI to determine whether the command operates correctly. It is important to note that the CLI may include hundreds of such commands that would each need to be individually tested. To accurately and efficiently test each of the commands included in the CLI, a different test case would need to be generated and analyzed for each or the permutations. Such a task, if done manually, is extremely error-prone and takes a significant amount of time.

As the foregoing illustrates, what is needed in the art is a mechanism for generating test cases for commands provided by a CLI.

SUMMARY OF THE INVENTION

One embodiment of the present invention sets forth a computer-implemented method for generating one or more tests for testing a command provided by a command line interface. The method includes the steps of receiving a specification for the command in a pre-determined meta-language, where the specification defines a first operator associated with the command and a first set of operands corresponding to the first operator, converting the specification into a tokenized notation that includes a first operator token for the first operator and an operand token for each operand in the first set of operands, generating a direct acyclic graph (DAG) based on the tokenized notation, where the first operator token is included in a first node of the DAG and each operand token is included in at least one other node of the DAG, and traversing a first unique path in the DAG from a root node to a first leaf node to generate a first test for testing the command that includes the first operator token and a first operand token included in one of the other nodes of the DAG.

Advantageously, the test tool described herein allows for the automatic and efficient generation of test cases for testing commands that each have many different permutations. Once a command is specified in the meta-language described above, the test tool is capable of generating a test case for each of the different permutations of the command. This allows for the extensive and exhaustive testing of CLI commands provided by a CLI.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
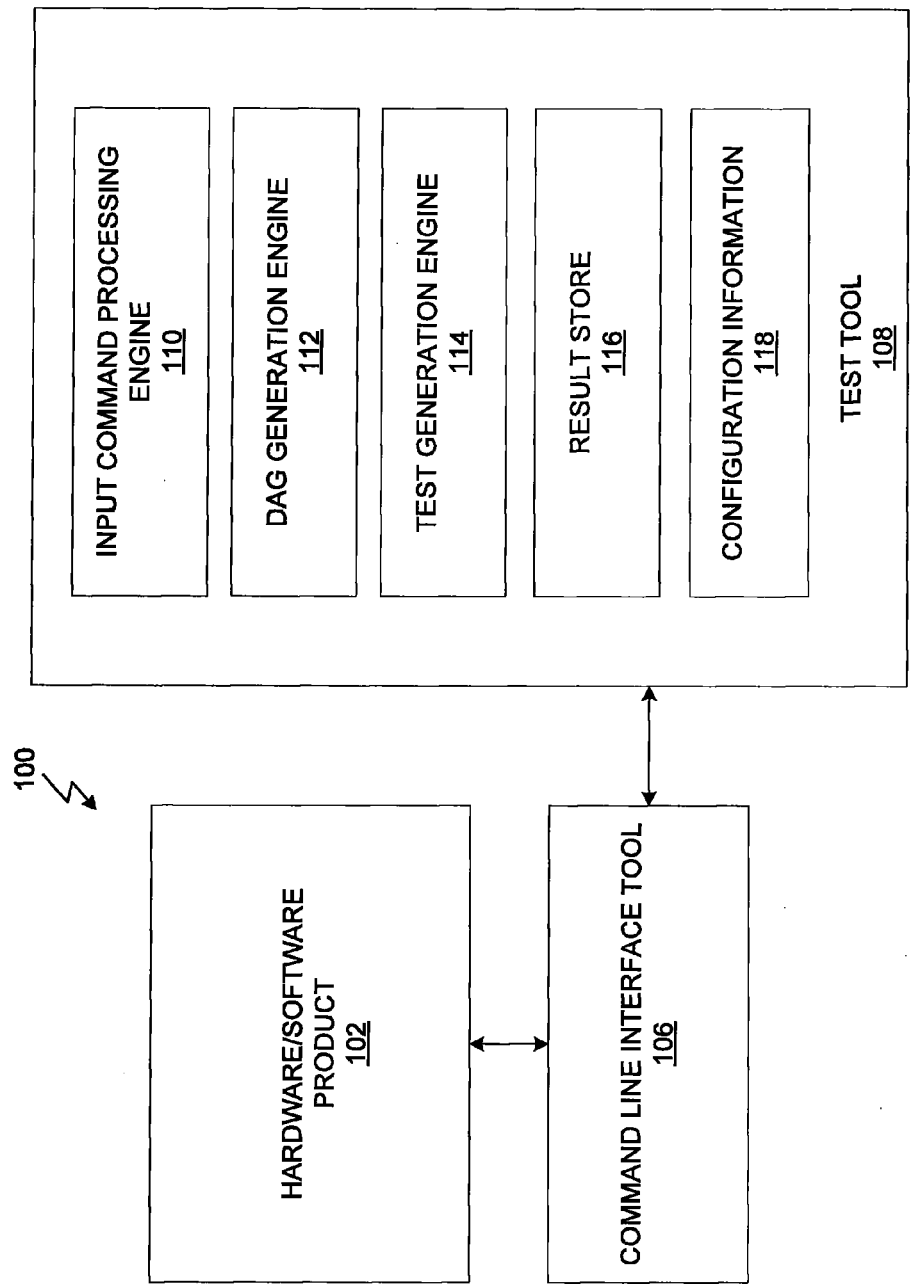
FIG. 1 illustrates a command line interface (CLI) tool testing environment, according to one embodiment of the invention.

FIG. 1 illustrates a command line interface (CLI) within a testing environment 100, according to one embodiment of the invention. As shown, the testing environment includes a hardware/software product 102, a CLI 106 and a test tool 108.

The hardware/software product 102 is any device or software platform that can be configured and managed via the CLI 106. The hardware/software product 102 can be a hardware device, such as a routing device or an embedded devices, or a software engine, such as an operating system. The CLI 106 provides a collection of commands to an administrator or user of the hardware/software product 102 for interfacing with the hardware software product 102. The commands may include commands for updating configuration information related to the hardware/software product 102, monitor the performance of the hardware/software product 102, managing the operation of the hardware software product 102, etc.

Each command provided by the CLI 106 includes operators, operands associated with the operators and other strings. So that a command provided by the CLI 106 can be comprehensively tested, the command is first specified using a pre-determined meta-language. The operators of the meta-language are shown in Table 1.

TABLE 1

| Operator | Precedence | Associativity | Number of operands |
|---|---|---|---|
| Grouping ( . . . ) | 4 | Left-to-right | NA |
| Choose zero/one ? | 3 | Left-to-right | 1 |
| Choose one or more + | 3 | Left-to-right | 1 |
| Choose zero or more * | 3 | Left-to-right | 1 |
| Choose a number in the range ≥ n1 & ≤ n2 <n1, n2> | 3 | Left-to-right | 1 |
| Choose 1 from n choices. n-ary choice \| | 1 | Left-to-right | N |
| Concatenation . (implicit) | 2 | Left-to-right | 2 |

The basic components of the meta-language include the operators described above in Table 1. Further, the meta-language that can be used to specify a command includes the components described below.

A string that can be an empty string.

A string that can be a character.

A string that can be a concatenation of two strings.

Suppose S is a string, S? indicates either an empty string or S, where the repeat count is 0 or 1 and may be limited based on a configurable setting within configuration information 118.

Suppose S is a string, S+ indicates S,SS,SSS, so on, where the repeat count is ≥1 and may be limited based on a configurable setting within configuration information 118.

Suppose S is a string, S* indicates <empty string>, S, SS, SSS so on, where the repeat count is ≥0 and may be limited based on a configurable setting within configuration information 118.

Suppose S is a string, S<n1,n2> indicates that the repeat count is n1 and ≤n2 and may be limited based on a configurable setting within configuration information 118.

Suppose S1 and S2 are strings, S1|S2 indicates that either S1 or S2 is selected.

A character set is defined by enclosing the characters of interest in [ . . . ]. For example, [aeiou] indicates that one of the lowercase vowels is picked.

A complement of a characters set is defined by enclosing the characters of interest in [^ . . . ]. [^aeiou] indicates that any character except lowercase vowels can be piocked.

A character set specification can include keywords enclosed in ":" to represent predefined sets of characters. :lower:, :upper:, :xdigit:, :digit:, :alnum:, :alpha:

'\' as an escape character to remove the special meaning of any character used in the meta-language.

'.' stands for any character.

Strings have a special role in testing and, therefore, a special operand $string$ is provided. If this operand is used, a built-in collection of interesting strings is iterated to provide a value for the operand.

Input text can have variables to refer to substrings, and these variables can be used in the rest of the input. The text that is defined by the variables is substituted in place of the variable.

Table 2 shows two command specifications defined using the meta-language.

TABLE 2

```
"show memory " (($address$ $addresss$?)" ")?
        (("processor "| "io "|"fast "|"multibus "|"pci ")?
        ("free"|"dead"|"allocating-process")?
"add ":num:\::num:
    ("name ":string:)? ("time ":mum:)? ("repeat ":num:)?
    ("interface "$interface$)? ("interval ":num:)? ("length
":num:)?
    ("select "("on"|"off"|"not")" ")?
    ("ioffset ":num:)? ("soffset ":num)?
    ("slength ":num)? ("ilength ":num:)?
    ("mask "(:num:|:string)?)?
    ("byte 0 ":hexnum:)?
```

Once a command is specified in the meta-language, the test tool 108 processes the specification to generate tests for testing the command. The tests are generated based on the specification in three stages. First, within the input command processing engine 110 of the test tool 108, the specification of the command is tokenized and converted into a post-fix notation. Next, within the direct acyclic graph (DAG) generation engine 112, the tokenized specification is processed to generate a DAG that represents the input command. Finally, within the test generation engine 114, tests for the command are generated based on the DAG. Each of these stages is described in greater detail below.

As describe above, during the first stage, the specification of the command is tokenized and converted into a post-fix notation within the input command processing engine 110. In operation, the input specification of the command is processed from left to right one character at a time. A stack data structure is initialized to save information related to nested operands and for the OR (|) operator. The logic used by the input command processing engine 110 to generate tokenized specification is shown in Table 3.

TABLE 3

If the next char is '('
    Enqueue ∞
    Push '(' onto the stack
    Attach a pointer to the location of corresponding '∞' to '(' entry in the stack
    If '(' is followed by a count operator, it is an error
If the next char is a '*','?','+'or'?'
    Enque
If <n1,n2> is the next text
    Enqueue <n1,n2> operator
If the next char is '|'
    Enqueue 'β'
    Push '|' onto the stack
    If '|' is followed by a count operator, it is an error
If the next char is ')' and top symbol in the stack is '|'
    Pop all the top '|''s from the stack. Keep a count.
    Suppose it is n.
    Enqueue |(n+1) operator.
    If the stack is not empty, the top symbol must be a '('.
    Else error. Change the corresponding ∞ to β in the output.
    Pop '('.
    This rule applies regardless of what follows ')'. Applies even in situations where ')' is followed by a count operator.'*','?','+','<n1,n2>'
If the next char is ')' and the top symbol in the stack is not '|'.
It must be a '('. Else error.
    If the next char (following ")") is one of the count operators like 1 +','?','*' or '<n1,n2>' then enqueue 'μ'. Change the corresponding '∞n' in the output to '∞'. Pop '('.
    If the next char (following ")") is not any of the count operators like '+','?','*' or '<n1,n2>' then delete the corresponding '∞' in the output. Pop '('.
If a character set specification like [.....], [^....] or '.' Then create a character set and enqueue the set identifier.
If $string$, enque.
Any other char/string, enqueue Table 4 and Table 5 below show the step-by-step processing of example input commands by the input command processing engine 110 based on the logic described in Table 3.

TABLE 4

| Output queue | Stack | Input | Notes |
| --- | --- | --- | --- |
|  |  | U(((xy*))\|((t\|( )))\|((ba*)+1))v |  |
| U |  | (((xy*))\|((t\|( )))\|((ba*)+1))v |  |
| U∞1 | (1 | ((xy*))\|((t\|( )))\|((ba*)+1))v |  |
| U∞1∞2 | (1(2 | (xy*))\|((t\|( )))\|((ba*)+1))v |  |

TABLE 4-continued

| Output queue | Stack | Input | Notes |
|---|---|---|---|
| U∞1∞2∞3 | (1(2(3 | xy*))\|((t\|( )))\|((ba*)+1))v | |
| U∞1∞2∞3xy | (1(2(3 | *))\|((t\|( )))\|((ba*)+1))v | |
| U∞1∞2∞3xy* | (1(2(3 | ))\|((t\|( )))\|((ba*)+1))v | |
| U∞1∞2xy* | (1(2 | )\|((t\|( )))\|((ba*)+1))v | |
| U∞1xy* | (1 | \|((t\|( )))\|((ba*)+1))v | |
| U∞1xy*β | (1\| | ((t\|( )))\|((ba*)+1))v | |
| U∞1xy*β∞4 | (1\|(4 | (t\|( )))\|((ba*)+1))v | |
| U∞1xy*β∞4∞5 | (1\|(4(5 | t\|( )))\|((ba*)+1))v | |
| U∞1xy*β∞4∞5t | (1\|(4(5 | \|( )))\|((ba*)+1))v | |
| U∞1xy*β∞4∞5tβ | (1\|(4(5\| | ( )))\|((ba*)+1))v | |
| U∞1xy*β∞4∞5tβ∞6 | (1\|(4(5\|(6 | )))\|((ba*)+1))v | |
| U∞1xy*β∞4∞5tβ | (1\|(4(5\| | ))\|((ba*)+1))v | Top is \| |
| U∞1xy*β∞4βtβ\|2 | (1\|(4 | )\|((ba*)+1))v | |
| U∞1xy*ββtβ\|2 | (1\| | \|((ba*)+1))v | |
| U∞1xy*ββtβ\|2β | (1\|\| | ((ba*)+1))v | |
| U∞1xy*ββtβ\|2β∞7 | (1\|\|(7 | (ba*)+1))v | |
| U∞1xy*ββtβ\|2β∞7∞8 | (1\|\|(7(8 | ba*)+1))v | |
| U∞1xy*ββtβ\|2β∞7∞8b | (1\|\|(7(8 | a*)+1))v | |
| U∞1xy*ββtβ\|2β∞7∞8ba | (1\|\|(7(8 | *)+1))v | |
| U∞1xy*ββtβ\|2β∞7∞8ba* | (1\|\|(7(8 | )+1))v | |
| U∞1xy*ββtβ\|2β∞7∞ba*μ | (1\|\|(7 | +1))v | ), next is + |
| U∞1xy*ββtβ\|2β∞7∞ba*μ+ | (1\|\|(7 | 1))v | |
| U∞1xy*ββtβ\|2β∞7∞ba*μ+l | (1\|\|(7 | ))v | |
| U∞1xy*ββtβ\|2β∞ba*μ+l | (1\|\| | )v | Drop ∞7 |
| Uβxy*ββtβ\|2β∞ba*μ+l\|3 | | v | |
| Uβxy*ββtβ\|2β∞ba*μ+l\|3v | | | |

TABLE 5

| Output queue | Stack | Input | Notes |
|---|---|---|---|
| | | A[aeiou]*[^123]<3,6>Z | |
| A | | [aeiou]*[^123]<3,6>Z | |
| AΩ1 | | *[^123]<3,6>Z | Ω1 is [aeiou] |
| AΩ1* | | [^123]<3,6>Z | |
| AΩ1*Ω2 | | <3,6>Z | Ω2 is [^123] |
| AΩ1*Ω2<3,6> | | Z | <...> is a repeat operator |
| AΩ1*Ω2<3,6>Z | | | |

As describe above, during the second stage, the output of the input command processing engine 110 (referred to herein as the "tokenized specification") is processed by the DAG generation engine 112 to generate a DAG. In operation, the DAG is generated piece by piece—a sub-graph is generated for each operator in the tokenized specification, and the different sub-graphs are then combined to generate the complete DAG. Once generated, each unique path in the DAG from the start node to a leaf node represents a string that satisfies the input specification.

To generate the DAG, a queue data structure is initialized to store the tokenized specification and a stack is initialized as a workspace. Each token in the queue data structure is processed according to the logic described below in Table 6. When the queue is empty, all the operands in the stack are combined to generate the DAG.

TABLE 6

| | | Next token in the input queue Next | | | | | |
|---|---|---|---|---|---|---|---|
| | Top | ∞ | β | μ | Repeat count operator | operand | \|n |
| Stack | ∞ | Push | Push | Pop. Delete this and the following count operator | Error. | Push | Error |
| | β | Push | Push | Error. | Error. | Push | Evaluate the \|n operator and push the result. Last operand is NULL. |
| | Operand | Push | Compute the expression upto the bottom or the top most ∞/β. Push the result. Push β. | Compute the expression upto the top most ∞. Pop ∞. Push the result. Skip μ | Apply to the operand, Pop. Push the result. | Push | Compute the expression upto the top most β. Push the result. Evaluate the \|n operator and push the result. |

Figure 2A:
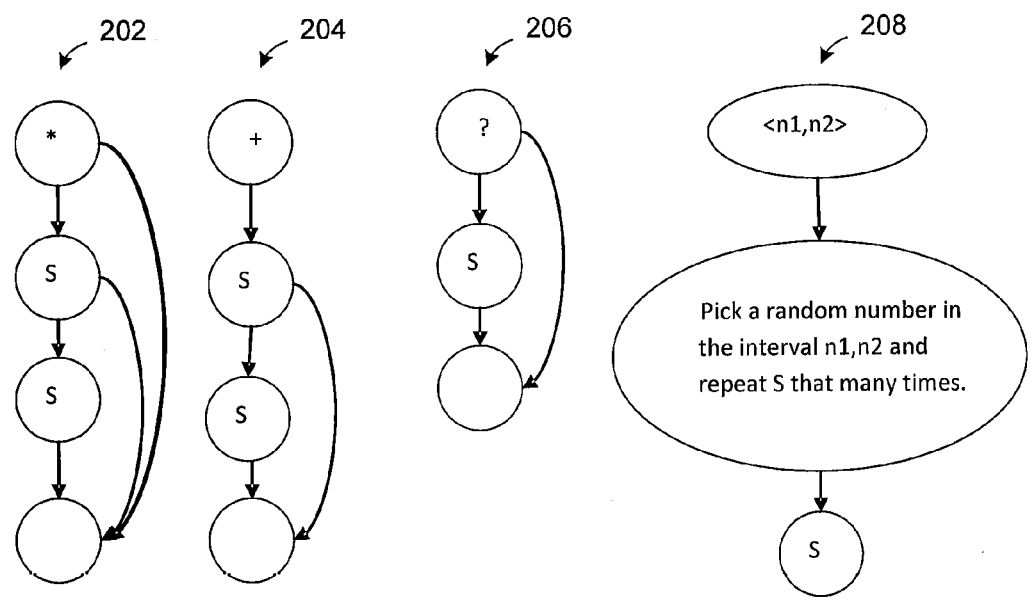
FIGS. 2A-2D illustrate direct acyclic graphs (DAGs) for various operators and expressions, according to one embodiment of the invention.
Figure 2B:
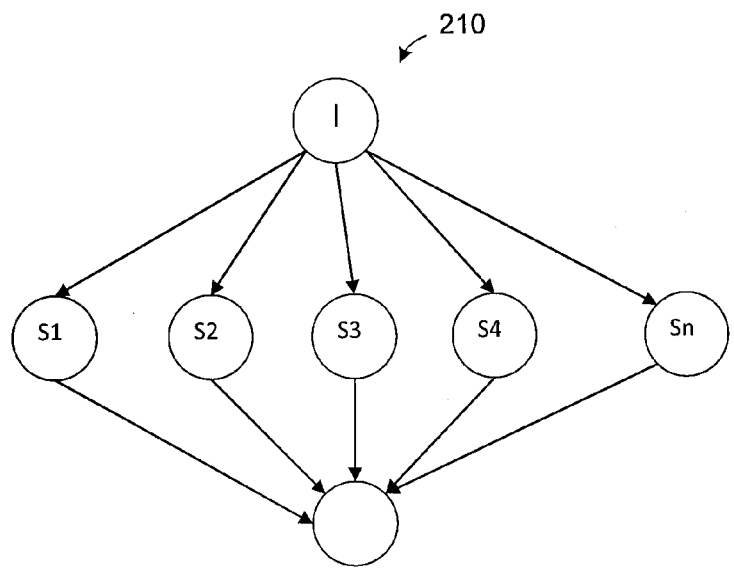
Figure 2C:
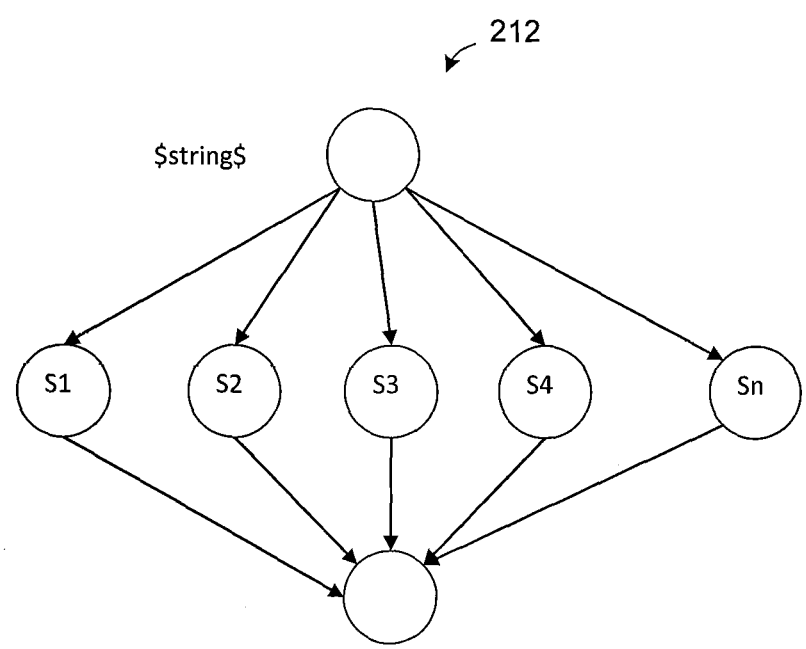
Figure 2D:
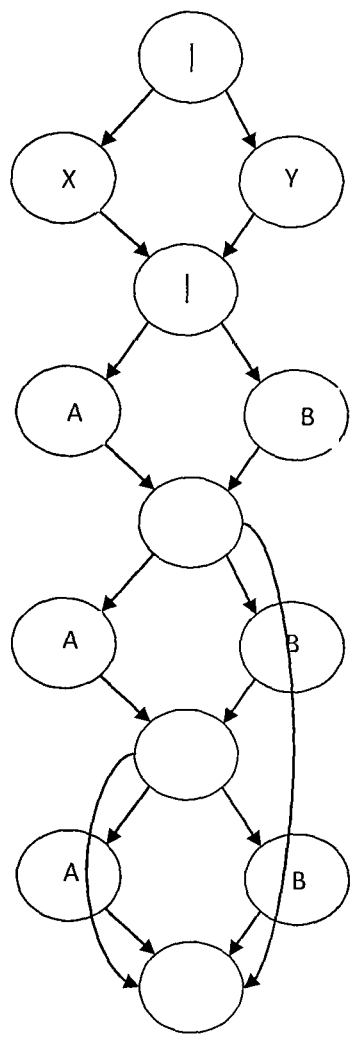

Examples of sub-graphs generated by the DAG generation engine 112 are illustrated in FIGS. 2A-2D. FIG. 2A illustrates the sub-graphs for different repeater operators. FIG. 2B illustrates the sub-graph for the OR (|) operator. FIG. 2C illustrates the sub-graph for the $string$ operand.

Once the DAG is generated, the test generation engine 114 generates test cases for executing within the CLI 106. In one embodiment, a depth first search (DFS) can be performed on the DAG to generate various tests, where each unique path from the root node of the DAG to a leaf node of the DAG represents a test case. In another embodiment, n (where n is chosen by a tester) unique paths can be selected at random, where, for each of the n unique paths, a next node is selected at random. In one embodiment, the tests are generated at run-time, and, in another embodiment, the tests are generated at compile-time.

Tests that are generated are executed within the CLI 106 to generate results that are stored in the result store 116. The result of an executed test may be substituted for a variable specified in a subsequent test. In addition, the results are analyzed to determine whether the command being tested operates correctly. For such an analysis, four kinds of errors are tracked, (i) command not recognized, (ii) command has syntax errors, (iii) command execution causes a crash and (iv) command causes a hang. Other metrics may be analyzed to determine whether the operation of the command is satisfactory.

Figure 3:
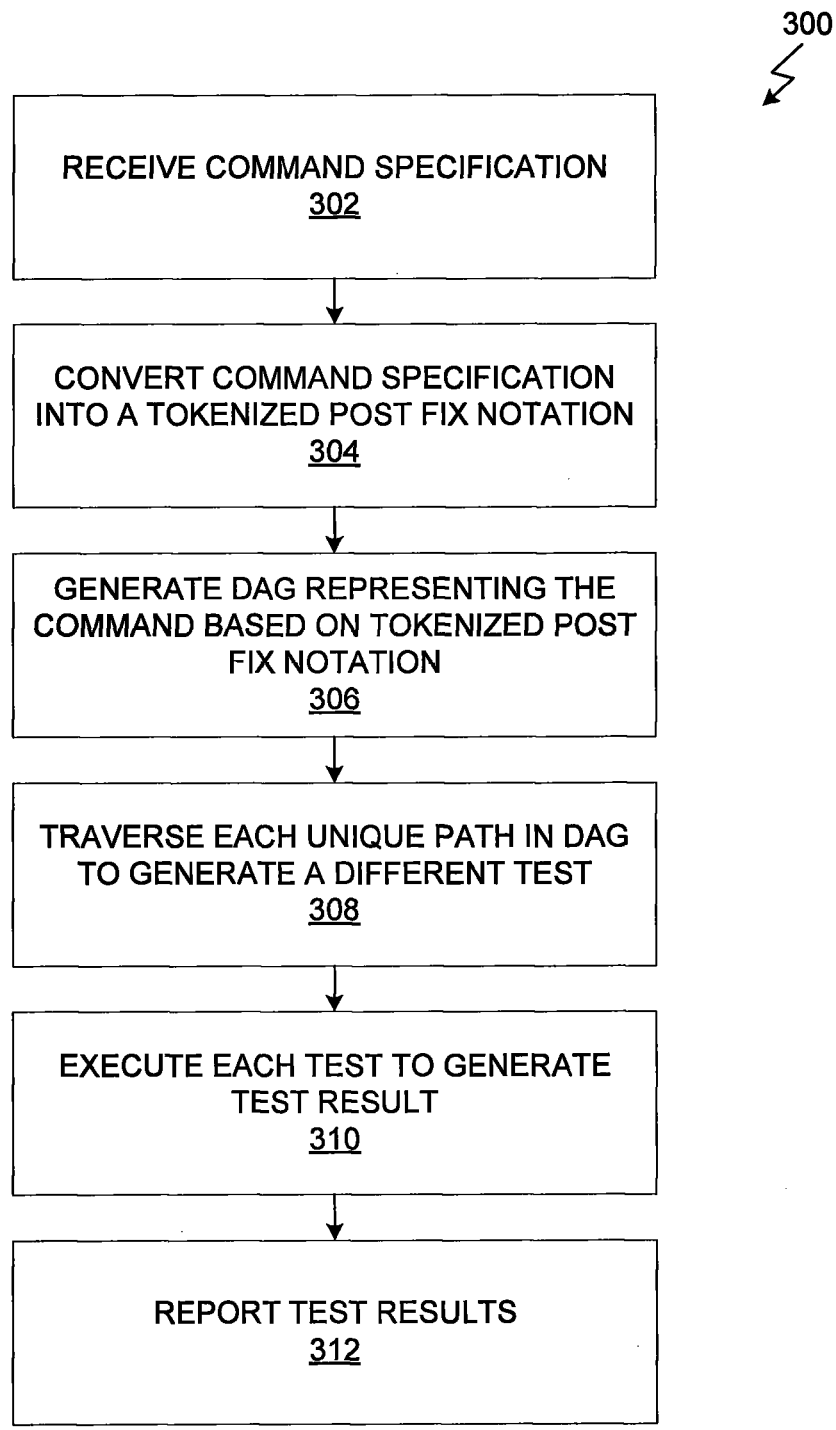
FIG. 3 is a flow diagram of method steps for generating test cases to test the operation of a command within a CLI, according to one embodiment of the invention.

FIG. 3 is a flow diagram of method steps for generating test cases to test the operation of a command within a CLI, according to one embodiment of the invention. Although the method steps are described in conjunction with the system of FIG. 1, persons skilled in the art will understand that any system configured to perform the method steps, in any order, is within the scope of the inventions.

The method begins at step 302, where the input command processing engine 110 receives an input command specification associated with a particular command and defined in the pre-determined meta-language described above. At step 304, the input command processing engine 110 converts the input command specification into a tokenized post-fix notation according to the logic described above in Table 3. The tokenized post-fix notation includes a different token for each operator associated with the command and each operand associated with the different operators of the command. In the tokenized post-fix notation, the operator tokens precede the operand tokens.

At step 306, the DAG generation engine 112 generates a DAG that represents the input command specification based on the tokenized post-fix notation using the logic described in Table 6. In operation, the DAG is generated piece by piece—a sub-graph is generated for each operator in the tokenized specification, and the different sub-graphs are then combined to generate the complete DAG. Once generated, each unique path in the DAG from the start node to a leaf node represents a string that satisfies the input specification.

At step 308, the test generation engine 114 generates a set of tests to test the operation of the command by traversing the DAG. As described above, a depth first search (DFS) can be performed on the DAG to generate various tests, where each unique path from the root node of the DAG to a leaf node of the DAG represents a test case. In another embodiment, n, where n is chosen by a user, unique paths can be selected at random, where, for each of the n unique paths, a next node is selected at random.

At step 310, each test that is generated by the test generation engine 114 is executed within the CLI 106. The execution of the test and the result generated, if any, are monitored to determine whether the command for which the tests are generated and executed is operating correctly. In addition, the result of the execution of each test is stored in the result store 116 to perform any necessary variable substitutions in subsequent tests. At step 312, the results of the execution of the tests are reported to the user.

Figure 4:
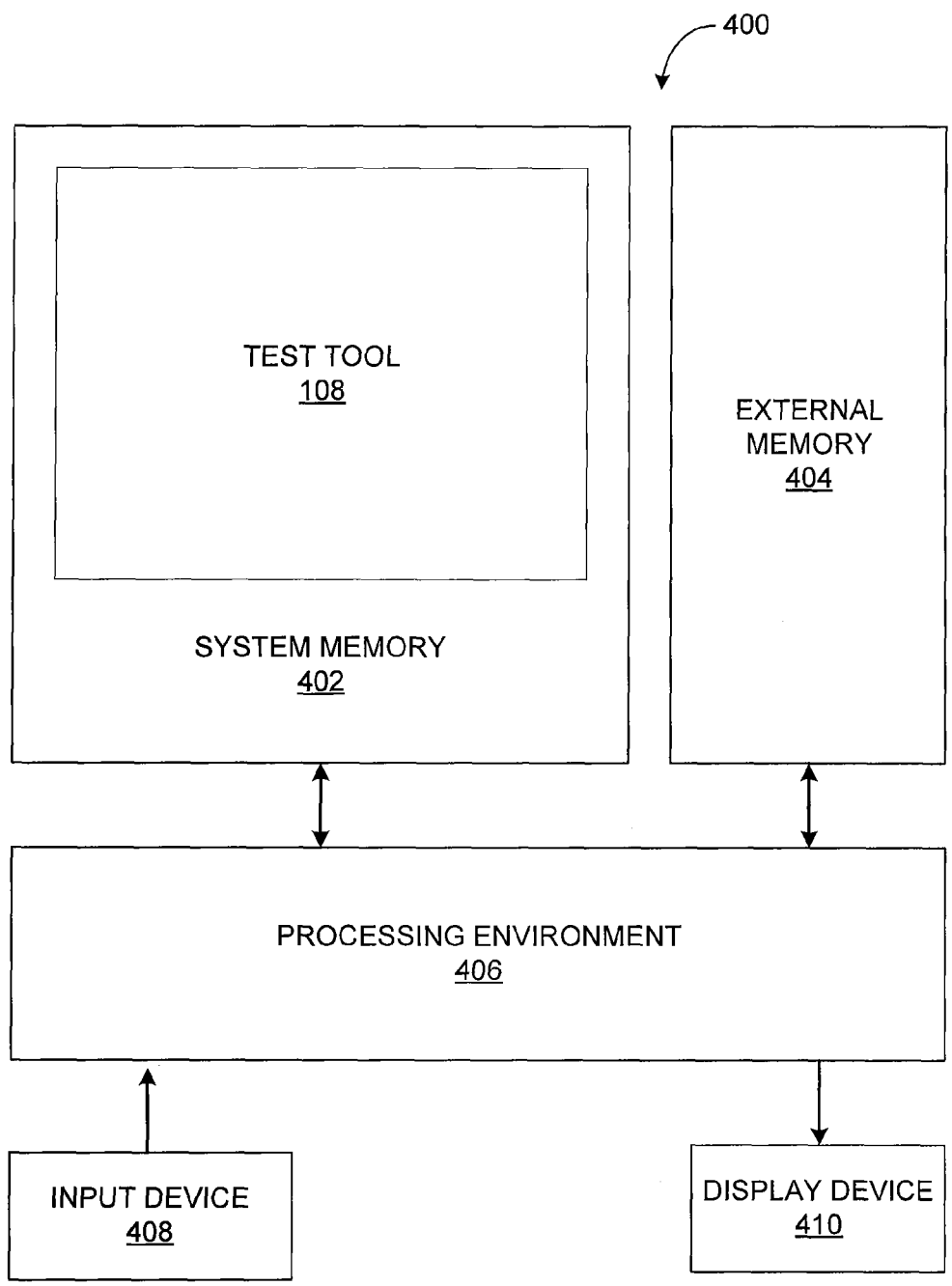
FIG. 4 is a block diagram of a system configured to implement one or more aspects of the invention.

FIG. 4 is a block diagram of a system 400 configured to implement one or more aspects of the invention. As shown, the system 400 includes a system memory 402, an external memory 404, a processing environment 406, an input device 408 and a display device 410. The system memory 402 includes the test tool 108 described herein. The system memory 402 is a memory space, usually a random access memory (RAM), that temporarily stores software programs running within the system 400 at any given time. The processing environment 406 includes one or more processors that each executes a sequence of stored instructions associated with and/or transmitted from the various elements in the computer system 400. The external memory 404 is a storage device, e.g. a hard disk, for storing data associated with the learning environment 100. The input device 408 is an end-user controlled input device, e.g. a mouse or keyboard, that allows a user to manipulate various aspects of the learning environment 100. The display device 410 may be a cathode-ray tube (CRT), a liquid crystal display (LCD) or any other type of display device.

FIG. 4 shows an exemplary system in which components of the testing environment 100 can be implemented. Persons skilled in the art would recognize that the testing environment 100 can be implemented in other types of systems or different portions of the testing environment 100 can be implemented across two or more systems.

Advantageously, the test tool 108 described above allows for the automatic and efficient generation of test cases for testing commands that each have many different permutations. Once a command is specified in the meta-language described above, the test tool 108 is capable of generating a test case for each of the different permutations of the command. This allows for the extensive and exhaustive testing of CLI commands provided by the CLI 106.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A computer-implemented method for generating one or more tests for testing a command provided by a command line interface, the method comprising:

receiving a specification for the command in a pre-determined meta-language, wherein the specification defines a first operator associated with the command and a first set of operands corresponding to the first operator;

converting the specification into a tokenized notation that includes a first operator token for the first operator and an operand token for each operand in the first set of operands;

generating a direct acyclic graph (DAG) based on the tokenized notation, wherein each unique path in the DAG represents a different permutation of the command, the first operator token is included in a first node of the DAG, and each operand token is included in at least one other node of the DAG;

traversing a first unique path in the DAG from a root node to a first leaf node to generate a first test for testing the command that includes the first operator token and a first operand token included in one of the other nodes of the DAG;

executing the first test within the command line interface to generate a result; and comprising analyzing the result based on an expected result to determine whether the command provided by the command line interface is operating correctly.

2. The method of claim 1, wherein the first operator comprises an OR operator, and the step of converting the specification comprises pushing the OR operator onto a stack data structure until each of the first set of operands associated with the OR operator is identified.

3. The method of claim 1, wherein the first operator comprises a repeat operator, and each operand token is included in at least two other nodes of the DAG.

4. The method of claim 3, wherein the repeat operator is associated with a pre-configured repeat count, and the number of the at least two other nodes is determined from the repeat count.

5. The method of claim 1, further comprising traversing a second unique path in the DAG from the root node to a second leaf node to generate a second test for testing the command that includes the first operator token and a second operand token included in a second of the other nodes of the DAG.

6. The method of claim 5, further comprising replacing the second operand token included in the second test with the result associated with the first test.

7. The method of claim 1, wherein the first test is generated at run-time.

8. The method of claim 1, wherein the first operand token represents a first operand that comprises a variable linked to a value, and further comprising replacing at least a portion of the first operand token included in the first test with the value.

9. A non-transitory computer-readable storage medium storing instructions that, when executed by a processor, cause the processor to generate one or more tests for testing a command provided by a command line interface, by performing the steps of:

receiving a specification for the command in a pre-determined meta-language, wherein the specification defines a first operator associated with the command and a first set of operands corresponding to the first operator;

converting the specification into a tokenized notation that includes a first operator token for the first operator and an operand token for each operand in the first set of operands;

generating a direct acyclic graph (DAG) based on the tokenized notation, wherein each unique path in the DAG represents a different permutation of the command, the first operator token is included in a first node of the DAG, and each operand token is included in at least one other node of the DAG;

traversing a first unique path in the DAG from a root node to a first leaf node to generate a first test for testing the command that includes the first operator token and a first operand token included in one of the other nodes of the DAG;

executing the first test within the command line interface to generate a result; and comprising analyzing the result based on an expected result to determine whether the command provided by the command line interface is operating correctly.

10. The computer-readable storage medium of claim 9, wherein the first operator comprises an OR operator, and the step of converting the specification comprises pushing the OR operator onto a stack data structure until each of the first set of operands associated with the OR operator is identified.

11. The computer-readable storage medium of claim 9, wherein the first operator comprises a repeat operator, and each operand token is included in at least two other nodes of the DAG.

12. The computer-readable storage medium of claim 11, wherein the repeat operator is associated with a pre-configured repeat count, and the number of the at least two other nodes is determined from the repeat count.

13. The computer-readable storage medium of claim 9, further comprising traversing a second unique path in the DAG from the root node to a second leaf node to generate a second test for testing the command that includes the first operator token and a second operand token included in a second of the other nodes of the DAG.

14. The computer-readable storage medium of claim 13, further comprising replacing the second operand token included in the second test with the result associated with the first test.

15. The computer-readable storage medium of claim 9, wherein the first test is generated at run-time.

16. The computer-readable storage medium of claim 9, wherein the first operand token represents a first operand that comprises a variable linked to a value, and further comprising replacing at least a portion of the first operand token included in the first test with the value.

17. A computer system, comprising:
a memory; and
a processor configured to:
receive a specification for the command in a pre-determined meta-language, wherein the specification defines a first operator associated with the command and a first set of operands corresponding to the first operator, convert the specification into a tokenized notation that includes a first operator token for the first operator and an operand token for each operand in the first set of operands, generate a direct acyclic graph (DAG) based on the tokenized notation, wherein each unique path in the DAG represents a different permutation of the command, the first operator token is included in a first node of the DAG, and each operand token is included in at least one other node of the DAG,
traverse a first unique path in the DAG from a root node to a first leaf node to generate a first test for testing the command that includes the first operator token and a first operand token included in one of the other nodes of the DAG,
executing the first test within the command line interface to generate a result; and
comprising analyzing the result based on an expected result to determine whether the command provided by the command line interface is operating correctly.

* * * * *